United States Patent
Schemmann et al.

(10) Patent No.: US 8,179,464 B2
(45) Date of Patent: May 15, 2012

(54) CIRCUIT AND METHOD FOR READING OUT AND RESETTING PIXELS OF AN IMAGE SENSOR

(75) Inventors: Heinrich Schemmann, Villingen-Schwenningen (DE); Sabine Roth, Moenchweller (DE); Steffen Lehr, Villingen-Schwenningen (DE); Volker Neiss, VS-Villingen (DE); Nicolaas Johannes Damstra, Breda (NL); Petrus Gijsbertus Maria Centen, Goirle (NL); Jeroen Rotte, Breda (NL)

(73) Assignee: Thomson Licensing, Issy-les-Moulineaux (FR)

( * ) Notice: Subject to any disclaimer, the term of this patent is extended or adjusted under 35 U.S.C. 154(b) by 299 days.

(21) Appl. No.: 12/227,675

(22) PCT Filed: May 23, 2007

(86) PCT No.: PCT/EP2007/055019
§ 371 (c)(1),
(2), (4) Date: Nov. 24, 2008

(87) PCT Pub. No.: WO2007/135175
PCT Pub. Date: Nov. 29, 2007

(65) Prior Publication Data
US 2009/0251580 A1    Oct. 8, 2009

(30) Foreign Application Priority Data

May 24, 2006   (EP) ..................................... 06300513
May 24, 2006   (EP) ..................................... 06300514

(51) Int. Cl.
  *H04N 3/14*   (2006.01)
  *H04N 5/235*  (2006.01)
(52) U.S. Cl. ......................................... 348/308; 348/362
(58) Field of Classification Search ............... 348/208.1, 348/208.6, 208.11, 208.13, 308, 323, 222.1, 348/294; 382/169, 194, 274; 250/305
See application file for complete search history.

(56) References Cited

U.S. PATENT DOCUMENTS

| | | | |
|---|---|---|---|
| 5,436,662 A | 7/1995 | Nagasaki et al. | |
| 5,517,242 A | 5/1996 | Yamada et al. | |
| 5,572,256 A | 11/1996 | Egawa et al. | |
| 6,115,065 A * | 9/2000 | Yadid-Pecht et al. ......... | 348/308 |

(Continued)

FOREIGN PATENT DOCUMENTS

JP    63-209280    8/1988

(Continued)

OTHER PUBLICATIONS

Search Report Dated Dec. 20, 2007.

*Primary Examiner* — Trung Diep
(74) *Attorney, Agent, or Firm* — Myers Wolin, LLC (57) ABSTRACT

A circuit for resetting and reading out a pixel cell of a CMOS image sensor is proposed. The circuit allows for reading out the pixel cell at least two times during a main integration interval, thereby generating at least two pixel signals. The circuit further comprises means for combining the at least two pixel signals to an output signal. The means for combining are operable to combine the at least two pixel signals weighted in dependence on a saturation level of the pixel cell. A method for controlling the circuit for reading out the image sensor is also proposed.

11 Claims, 8 Drawing Sheets

U.S. PATENT DOCUMENTS

| | | | |
|---|---|---|---|
| 6,219,097 B1 | 4/2001 | Kamishima et al. | |
| 6,982,757 B2 * | 1/2006 | Tariki | 348/243 |
| 7,382,407 B2 * | 6/2008 | Cho et al. | 348/296 |
| 7,538,794 B2 * | 5/2009 | Turley et al. | 348/208.1 |
| 7,616,231 B2 * | 11/2009 | Farrier | 348/208.99 |
| 2002/0122126 A1 | 9/2002 | Lenz | |
| 2003/0095189 A1 | 5/2003 | Liu et al. | |
| 2005/0151866 A1 | 7/2005 | Ando et al. | |
| 2005/0237406 A1 * | 10/2005 | Kim et al. | 348/308 |

FOREIGN PATENT DOCUMENTS

| | | |
|---|---|---|
| JP | 2-50584 | 2/1990 |
| JP | 5-308573 | 11/1993 |
| JP | 7-38815 | 2/1995 |
| JP | 7-75026 | 3/1995 |
| JP | 7-87402 | 3/1995 |
| JP | 10-155112 | 6/1998 |

* cited by examiner

Pixelgrid

Vertical lower resolution.
Field 1

Reconstruction:

Field 2

CIRCUIT AND METHOD FOR READING OUT AND RESETTING PIXELS OF AN IMAGE SENSOR

This application claims the benefit, under 35 U.S.C. §365 of International Application PCT/EP2007/055019, filed May 23, 2007, which was published in accordance with PCT Article 21(2) on Nov. 29, 2007 in English and which claims the benefit of European patent application No. 06300514.4, filed May 24, 2006 and European patent application No. 06300513.6, filed May 24, 2006.

The invention relates to a circuit and a method for resetting and reading out pixels of an image sensor and in particular to image sensors in CMOS technology.

Image sensors, especially CMOS image sensors, are widely used in the fields of video or surveillance cameras, measuring devices or as an add-on in mobile phones. Further, image sensors of this kind are increasingly used for professional video camera applications, e.g. in broadcast and feature film.

A typical CMOS image sensor comprises a plurality of pixel cells which convert light impinging on the respective pixel into a voltage signal and which are conventionally arranged in rows and columns. More precisely, the pixel is reset by a reset signal and impinging photons are converted into electrons which are collected or integrated over an integration period, so that the resulting voltage signal shows an increasing or decreasing course, the gradient being dependent on the amount of converted photons. At the end of the integration period, the voltage signal is read out and represents the brightness value of the pixel.

A general desire in the art is to enhance the dynamic range of CMOS image sensors and at the same time reduce negative effects like signal noise.

To achieve this aim document EP 1 641 249 A1 discloses an improvement in or relating to image sensors, whereby the odd rows of a pixel array are read out after a short integration period and the even rows are read out after a longer integration period. After both read out processes two adjacent pixel rows—one even and one odd row—are stitched together to form a single output line with a wide dynamic range. It is acknowledged by the document itself that the wide dynamic range is achieved at the expense of a loss of resolution of the resultant image.

Document US 2005/0078205 A1 proposes a low noise image sensing system and method for use with sensors with very small pixel size, the pixels being read out and reset multiple times during a frame period. In a successive step the read out values of a frame period are integrated or added to form the brightness value of the pixel resulting from the frame period.

A further solution for a high dynamic range CMOS image sensor is described in the document EP 1 233 613 A2, in which an adaptive pixel reset is implemented so that during a frame period only pixels with high output are reset.

Document EP 0 862 829 B1 discloses an image sensor with high dynamic range linear output. In order to realize the high dynamic range the single pixel of the image sensor is read out multiple times during a frame period and the read out values are accumulated to a high resolution output value. In one embodiment it is proposed to use a non-destructive read out method, which means that the pixel is reset only once during a frame period.

Although solutions for achieving a high dynamic range exist a general desire in the art of further improving the dynamic range and minimising negative effects during read out of image sensors still remains.

This object is achieved by a circuit with the features of claim 1 and by a method with the features of claim 26. Advantageous or preferred embodiments of the invention are disclosed in the dependent claims, the description and the figures.

The circuit is operable to reset and to read a virtual or real pixel cell of an image sensor. Preferably the image sensor provides a plurality of pixel cells, which are arranged in rows and columns or in another arrangement, for example in concentric rings. Normally the image sensor is sensible for light in the visible spectrum, but also image sensors sensible only to the UV, NIR and/or IR spectrum are covered by the invention. The real pixel cell is defined as a sub-unit of the circuit comprising one single physical pixel, so that the real pixel cell preferably comprises one single photodiode or light-sensing element. The real pixel cell is preferably realised as an active pixel, for example a photodiode CMOS APS, a pinned photodiode CMOS APS or passive pixel. The virtual pixel cell is defined as a logical combination of two or more real pixel cells. The image sensor is for example used in video-cameras, digital still cameras, mobile phones or measurement equipment. In the connection of the description and the claims a pixel cell is to be interpreted as a real or as a virtual pixel cell.

The circuit comprises means for resetting the pixel cell, wherein the time interval between a first reset and a subsequent reset of the pixel cell is defined as a main integration period. A reset indicates the beginning of a respective main integration period. The resets occur in regular intervals, without a further reset in between. The main integration period is preferably equivalent to the frame rate of the image sensor. Hence, there is only one reset per main integration period. The step of resetting the pixel cell is for example carried out by emptying the electrons, which were accumulated or integrated during the integration period, or by setting the pixel cell to a predetermined state, e.g. voltage, or the like.

Furthermore means for reading out the pixel multiple times during the integration period is provided, which is operable to read out the respective pixel cell two, three or more times during the main integration period. As already underlined above, the read-outs are non-destructive, i.e. without further resets within the main integration interval or period.

The circuit also comprises means for forming an output signal from the at least two pixel signals, wherein the output signal represents the illumination of the pixel during the integration and/or frame period, respectively.

According to the invention the means for accumulating are operable to combine the at least two pixel signals in a weighted manner in dependence on a saturation level of the pixel in order to generate the output signal. The saturation level is the actual value of the saturation of the pixel cell, which is preferably read out as one of the at least two pixel signals. Hence the at least two pixel signals are not only combined by addition—as known from the prior art—but are weighted in dependence on the actual saturation level of the pixel in a first step and combined in a second step.

One finding of the invention is that a simple addition of the read-out values does not lead to satisfying results over the achievable dynamic range of the pixel cell or the image sensor. So it seems to be advantageous to use the read out value with a longer integration time for generating the output value in case the saturation level is low, to use the read out value with the shorter integration time in case the saturation level is high and to mix the two read out values in a transition zone between the higher and the lower saturation level weighted in dependence on the saturation level, especially in order to minimise disturbing noise effects.

Terms like pixel signal, dark signal and further signals, which are used herein, are preferably equivalent to the minimum, maximum or extreme values of the respective time dependent signal.

In the most preferred embodiment, the circuit and or parts thereof is realised in CMOS (complementary-metal-oxide-semiconductor) technology and/or realised as on-chip integrated circuit.

In an advantageous embodiment, the means for reading out multiple times is operable to read out the pixel for obtaining a lesser-bright signal and for reading out the pixel afterwards a further time for obtaining a bright signal, no reset being applied to the pixel cell between the first read-out and the second read-out. Thus, the pixels of the imager are read out after a first and a second exposure time, the first exposure time being shorter than the second exposure time. As the saturation level of the pixel cell has a monotonic behaviour during the integration period, the absolute value of the amplitude of the lesser-bright-signal is equal to or lower than the absolute value of the amplitude of the bright signal.

It is further preferred that the means for reading out multiple times is operable to read out the pixel during the integration period for obtaining a dark signal. The dark signal is preferably read out immediately after the reset of the pixel cell at the beginning of the integration period. The dark signal represents the kTC noise of the pixel cell and further comprises information about the reset level of the pixel cell which sometimes differs from one pixel cell to another pixel cell.

The compensating of the read-out pixel signals by subtracting the dark signal is called CDS (correlated double sampling). Many CMOS imagers claim to have CDS implemented, but in fact the known systems read out the pixel signal from one integration period and the dark signal from the next integration period. So the measured kTC has no relation with the pixel signal from the current frame. According to the preferred embodiment the pixel signal(s) and the dark signal are read out separately for one and the same frame. Preferably the value of the dark signal is externally stored—for example in a frame store—in order to be able to have corresponding values for the same frame. So pixel signal(s) and dark signal refer to the same reset moment or frame or integration period and the correct kTC noise level is subtracted. This method may be called variable digital double sampling or VDDS. VDDS may be used to improve the S/N (signal/noise) performance, in particular in dark areas of an image.

In a further embodiment the VDDS is implemented, so that the black values, or dark signal, of pixels of every line are stored. As a consequence the subtraction operation performed in VDDS may also be used for compensating threshold voltage differences between pixels. Further, vertical and horizontal shading or blooming is suppressed.

In yet a further preferred embodiment, the means for combining are operable to compensate for the reduced exposure time of the lesser-bright signal. The proposed compensation is useful for bringing the at least two pixel signals into the same scale, so that they can be accumulated properly. Preferably the lesser-bright signal is amplified by a factor depending on the ratio between the frame period or integration time and the time period between first reset and the readout of the lesser-bright signal. However, it is also possible to compensate the bright-signal for example by multiplying the bright signal by the reciprocal value of said factor. More generally spoken in the case of n pixel signals it is possible to compensate for the exposure time of n−1 pixel signals, so that all n pixel signals refer to the same scale.

In a further preferred embodiment the means for accumulating are operable to use a weighting function which comprises an extended transition section, wherein the lesser-bright signal and bright signal are amplified by a lesser-bright gain and a bright gain respectively. A practical realisation is for example embodied by implementing a transfer function with a brightness or saturation level dependent gain for the at least two pixel signals, wherein the transfer function comprises an extended transition zone in which the output signal is the weighted average of the at least two pixel signals. So in the transition zone a level-dependent gain is applied to both signals and both signals are combined. The dependency may in general be expressed as a proportional dependency or any other dependency, wherein in the transition zone at least two, three or more different gain values are used. The sum of the gain of both signals is preferably normalized and/or equivalent to 1. The means for combining may include a microprocessor or a DSP running a corresponding calculation software.

It is preferred that the transition zone ends at or below a threshold value, which is equivalent to the maximum read-out value of the bright signal. The maximum read-out value is for example limited by the full-well capacity of the pixel cell or by the maximum value of the ADC (analogue-to-digital converter), which converts the pixel signals into digital data. Therefore the threshold value may be expressed in Volts or in digital numbers, for example 4095 for a 12 bit resolution ADC.

In a further embodiment of the invention the circuit is operable to reset and to read out an image sensor having a plurality of the pixel cells arranged in rows and columns, wherein pixel cells arranged in a column can be selectively coupled to a common line for reading out values corresponding to light impinging on the image sensor, wherein a first shift register is provided for addressing lines of pixels for resetting, wherein a second shift register is provided for addressing lines of pixel cells for reading values from the pixel cells at the end of the integration period corresponding to the frame rate of the image sensor, wherein a third and fourth shift register are provided for addressing lines of pixel cells for reading out values at different time instances between resetting the pixel and the end of the integration period. In this embodiment the means for resetting are realised as the first shift register, the means for multiple reading out as the second, third and fourth shift register, which are operable for a multiple read out during the integration period.

Further setting means are optionally provided, which are operable to perform an automatic dynamic range algorithm, wherein the time for reading out the lesser-bright signal and/or the time for reading out the bright signal is set in dependence on the number of clipped lesser-bright signals and/or the number of clipped bright signals across the whole image. In general all timing moments for reading out during the integration period are adjustable, so that different extended dynamic range settings can be provided, so that the settings can be adapted to the scene, especially to the illumination of the scene, to be photographed. These settings are preferably adjusted automatically, however also a manual adjustment by the user is possible. The automatic dynamic range algorithm sets the timing moments for example in dependence on the clipped values of one of the at least two pixel signals. Clipped values are defined as values of pixel over the threshold limit, i.e. over the full well capacity of the pixel cell and/or over the maximum resolution of the ADC. For example the settings are adjusted so that the lesser-bright signals of the whole image contain around 10% and the bright signals of the whole image contain around 50% clipped values. However the conditions may be set depending on the requirements of the user or other requirements.

It was noticed that using a dark signal value, a lesser-bright-signal value and a bright-signal value of each pixel cell for generating an extreme dynamic range information of the respective pixel cell as explained above leads to an increase of the data-stream in comparison to circuits only using a dark-signal value and a bright-signal value. Round about, the data-stream needs to be increased with a factor of 3/2. On the one hand side this is acceptable for achieving a high dynamic range image. On the other hand side in some applications there is a desire to reduce the data-stream. Especially for these applications the invention proposes a trade-off between dynamic range information and resolution of the image, so that the data-stream can be reduced.

Thus one finding of the invention is that real pixels are logically combined to virtual pixels, wherein for each virtual pixel only one pixel value is output in the high dynamic range image. The concept of the virtual pixel cell leads to a vertical and/or horizontal reduction of the resolution of the high dynamic range image.

In a preferred embodiment, adjacently arranged real pixel cells are combined to one of the virtual cells. The real pixels cells which are combined in one virtual pixel cell may be arranged in any order, but preferably the real pixel cells of one virtual pixel cell refer to a common row and/or to a common column.

In order to simplify the realisation of the concept of the virtual pixels cells, it is preferred that the circuit is operable to generate an intermediate image having matrix elements, wherein adjacently lying matrix elements are filled with values of lesser-bright-signals and with bright-signals. Especially the values of the lesser-bright-signals and the bright-signals are dark-signal compensated, for example by subtracting the respective dark-signal value.

Following the concept of the virtual pixel cell it is preferred that each virtual pixel cell comprises at least one of the matrix elements filled with a lesser-bright-signal and at least one of the matrix-fields filled with a bright-signal value. Thus a high dynamic range value of the virtual pixel cell is derivable by combing the at least two signal values for example as described before, wherein the at least two signal values refer to at least two different real pixel cells.

In a preferred development of the invention, the circuit is realised to generate an intermediate image having matrix elements, which are filled with values of lesser-bright signals and bright signals. The number of the matrix elements correspond to the number of the (used) real pixel cells of the image sensor. Preferably the values are distributed in such a manner, so that values of adjacently arranged matrix elements can be combined to form a high dynamic range value of a virtual pixel cell.

In yet a preferred embodiment, the values of the lesser-bright-signals are arranged in rows or in columns and the values of the bright-signals are arranged in other rows or columns, respectively.

A possible alternative realises the arrangement of the values so that two rows (columns) of lesser-bright-signal values alternate with two rows (columns) of bright-signal values. This alternative presents the intermediate image for a vertical (horizontal) lower or reduced resolution. Another possible alternative realises the arrangement of the values in a checkerboard-like pattern, which allows a horizontal or a vertical resolution reduction of the final image.

In an implementation of the invention, the circuit is operable to read out the image sensor twice within one integration period and/or within one frame period. Thereby two full-fields, each comprising one signal value per real pixel cell are read out, wherein the two full-fields are embodied so that the intermediate image can be derived from the two full-fields.

In a further development of the invention the full-fields are structured, so that these each comprise dark-signal rows, wherein the dark-signal rows are filled only or exclusively with dark-signal values. Preferably each second row of the full-fields is a dark-signal row and—more preferably—the dark-signal rows are arranged so that for each real pixel cell a dark-value is read out.

In one possible implementation each of the two full-fields comprises lesser-bright-signal rows filled exclusively or only with lesser-bright-signal values and bright-signal rows filled exclusively or only with bright-signal values. Thereby it is especially preferred that the rows between the dark-signal rows are alternating between lesser-bright-signal rows and bright-signal rows.

In another possible implementation the rows beside the dark-signal rows are filled with lesser-bright signal values and bright signal values in a checkerboard-like manner. So each row alternates with lesser-bright signal values and bright signal values and the columns alternate in the same manner.

Thus the invention also concerns a method for controlling an image sensor, characterised in that pixels in subsequent lines or columns are alternating read out after a first or a second integration time period during one frame period. Optionally subsequent lines or columns are read out after a first, a second and up to an n-th integration time during one frame-period. Furthermore optionally n complete images or full-fields are read out with different integration times during one frame period. Especially exactly two images or full-fields are read out during one frame period, wherein one is exposed for a frame period or full integration time and the other is exposed for a lesser period of time.

The invention further covers a method for addressing an image sensor according to claim 26 including the steps of:

resetting a pixel cell;

reading a value corresponding to a pixel cell exposed during full exposure period, the full exposure period being a time period corresponding to the frame rate of the image sensor;

characterised in that the method further includes the steps of:

reading a value at a time instant within the full exposure period;

combining the value read within the full exposure period and the value read at the time instant within the full exposure period weighted in dependence of the saturation level of the pixel cell.

The method may optionally also include reading a value corresponding to a reset pixel cell. Preferably the method uses the circuit as described above or as laid down in the appended apparatus claims. Especially, the resetting step is fulfilled by the resetting means, the multiple reading by the multiple reading means and the combining by the combining means.

In a preferred embodiment the method comprises a step of calculating a corrected value from the value read within the full exposure period based on the ratio of the full exposure period and the time during which the pixel cell was exposed after reset and before it was read out. This step is preferably fulfilled by the means for combining and is used for adapting different impinging times as described above.

Further features, advantages and/or effects of the invention are disclosed by the following detailed description of preferred embodiments of the invention and the figures, in which:

Identical or equivalent parts are referenced by the same reference numerals.

Figure 1:
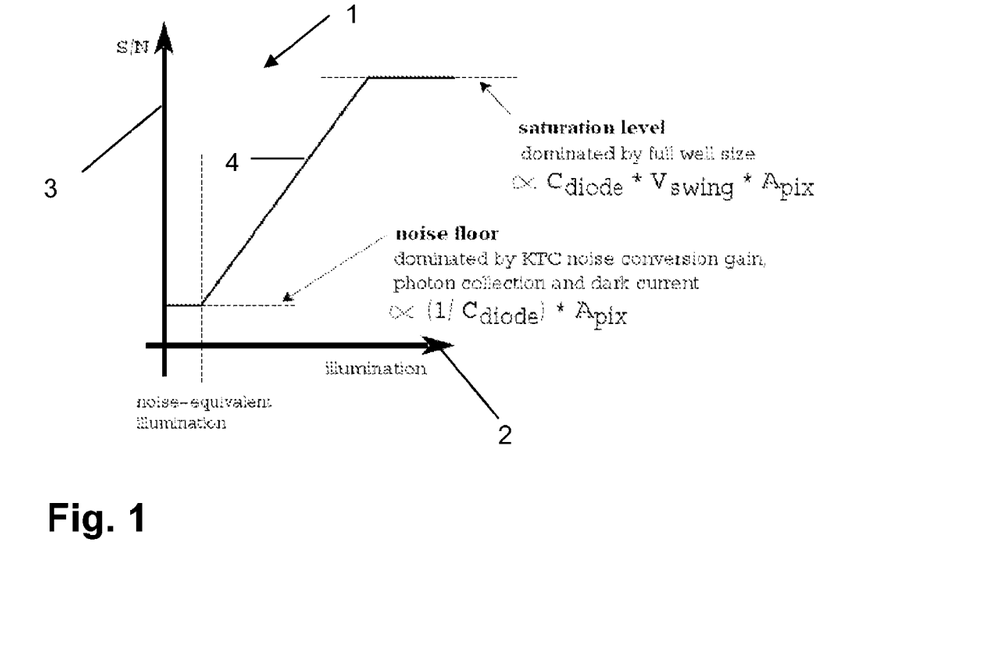
FIG. 1 illustrates the maximum useful dynamic range and limiting factors of a CMOS image sensor.

FIG. 1 illustrates the maximum dynamic range and the limiting factors of a pixel cell, for example a CMOS APS, by means of a coordinate system 1.

The horizontal axis 2 of the coordinate system 1 represents the illumination of the pixel cell and the vertical axis 3 the signal level in dependence of the illumination. The signal level is bound by the noise floor on the low illumination end of axis 2, and by the saturation level at the high illumination end of axis 2. It is to be noted that the illumination in the figure represents the integrated illumination over time. The dynamic range of the pixel cell, determined by the ratio of saturation level to noise floor level, is relevant for covering the intra-scene and/or inter-scene dynamic range of the scene photographed. Intra-scene dynamic range refers to the ratio within one image, whereas inter-scene dynamic range refers to the ratio between successive images.

The graph of the illumination-level function 4 comprises a first section parallel to the horizontal axis 2, a second, linear increasing section and a third section, which is parallel to the horizontal axis 2.

The first section represents the minimum detectable signal, which is determined by the noise floor caused by electron noise and which determines the minimum illumination signal. The noise floor can also be expressed as a noise equivalent illumination.

The third section represents the maximum detectable signal and is determined by the full-well capacity of the image sensor or the pixel cell in terms of electrons. The maximum signal corresponds to a full saturation signal, which in turn corresponds to a corresponding full saturation illumination multiplied by the exposure time.

Figure 2:
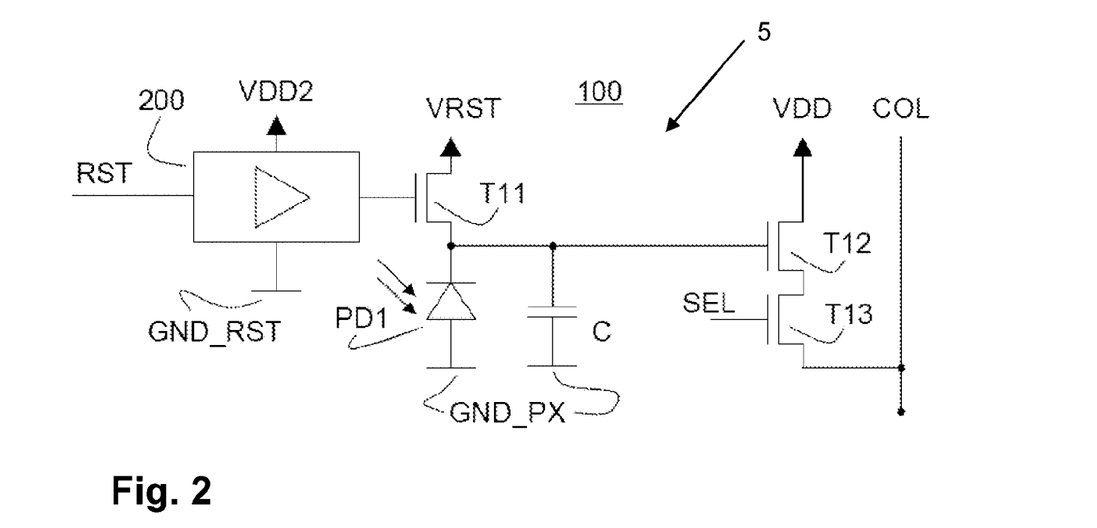
FIG. 2 illustrates a connection diagram of a real pixel cell according to the invention.

FIG. 2 shows an example of a pixel circuit 5 used in connection with the present invention as a connection diagram. The pixel or photodiode PD1 is illuminated by impinging photons. The impinging electrons are converted into electrons by the photo-electric effect. These electrons are accumulated in the capacitor C. In order to empty or to reset the capacitor C a selecting pulse can be applied to the node RST. For reading out the capacitor C selecting pulses are applied at the node SEL.

Figure 3:
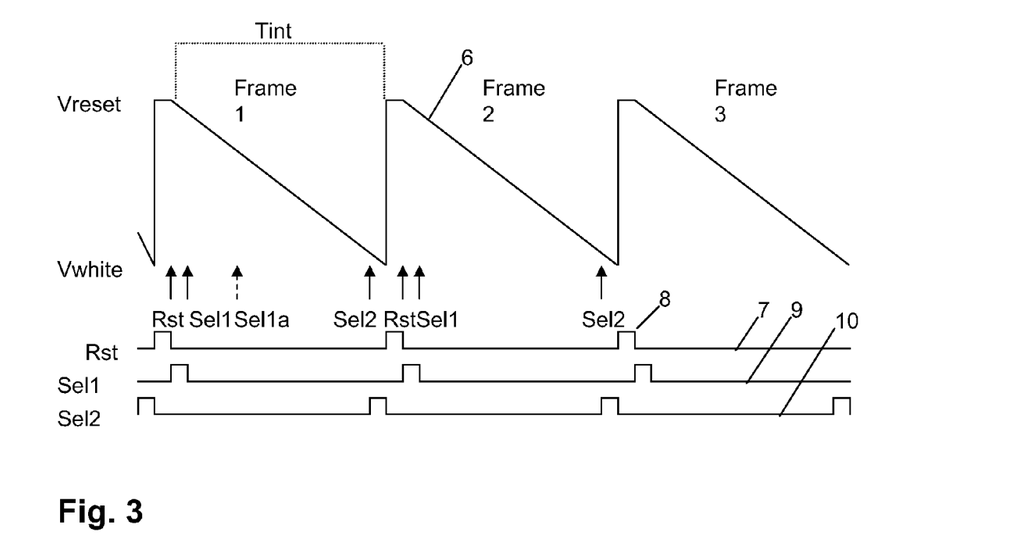
FIG. 3 shows time dependent signal graphs in order to explain the creation of charges in the pixel cell in FIG. 2 and the VDDS technique.

FIG. 3 shows time dependent signal curves in order to explain the creation of charge in the pixel cell in FIG. 2 and the VDDS technique. The upper line represents a charging line 6 of the capacitor C in FIG. 2. The charging line 6 is divided into frame sections, which refer to frame 1, frame 2, frame 3 etc., each frame section exemplarily representing the temporal period of a single frame.

At the beginning of a frame section the pixel circuit 5 is reset by applying a selection pulse at the node RST. The selection pulse is depicted in FIG. 3 by the Rst-line 7, which shows a rectangular reset pulse 8 at each beginning of a frame section. In response to the reset pulse 8, the capacitor C and thus the charging line 6 is reset to a reset-level Vreset, which corresponds to the kTC noise floor of the pixel cell 5. During the integration time Tint of light impinging on the image sensor or the photodiode PD1 the voltage at the photodiode PD1 or at the capacitor C drops, as shown by the linear decrease of the charging line 6 until the level Vwhite is reached, which corresponds to the video level after maximum integration time.

Furthermore selection lines 9 and 10 (Sel 1, Sel 2) are shown for selecting for readout at two different time instances during Tint. The first selecting Sel 1 for reading is normally for reading out the reset value or dark value Vsel1 taken at the time instance Tsel1, whereas the second selecting sel2 for reading is for reading the bright value or the value after exposure Vsel2 at the time instance Tsel2. The time instances Tsel1 and Tsel2 are indicated in the FIG. 3 by the selecting pulses and/or by the arrows Sel1 and Sel2 respectively.

The output video value is calculated by subtracting the values for Vsel1 from Vsel2 to suppress the kTC noise. It shall be underlined that the dark value Vsel1 and the bright value Vsel2, which are combined to calculate the resulting output value for the actual frame, are taken from one and the same frame. This technique may be called VDDS (variable digital double sampling).

The output at time Tsel1 corresponds to Vreset, while the output at a time Tsel2 corresponds to Vreset+Vwhite. The ratio Tsel2/Tint indicates the point of time at which the white value is taken with respect to the maximum integration time possible. The maximum possible integration time is determined by the frame rate and the number of lines in a frame in case all pixels in a line are addressed for simultaneous readout. For example 24, 30, 50, 59, 94 are popular rates for frames per second, but generally any other frame rate is possible.

In order to improve performance of the image sensor for bright areas a modified readout method described in the following can be used. Since the photodiode PD1 is illuminated before and during readout of Vsel1, there is charge build-up in the capacitor C. Thus this value Vsel1 can be used to calculate the video level if the image sensor or the pixel cell is saturated when reading Vsel2, i.e. when the signal read for Vsel2 is clipped. Typically Vsel1 is a measurement with a very short integration time, usually as short as possible after reset, but it is also possible to shift this moment to Vsel1a, delaying the readout for a certain time. However, this modified readout method involves a trade-off between kTC noise suppression and dynamic range, as the dark value is no longer tightly coupled to the reset moment. The resulting output value is preferably calculated as explained later in connection with FIG. 5 et seq., whereby the value Vsel1 or value Vsel1a is used as the lesser-bright signal and the value Vsel2 is used as the bright signal and whereby the dark signal (kTC) compensation is omitted.

In order to provide both excellent kTC noise suppression as well as enhanced dynamic range it is preferred to use a third vertical shift register for addressing a pixel cell for readout.

Figure 4:
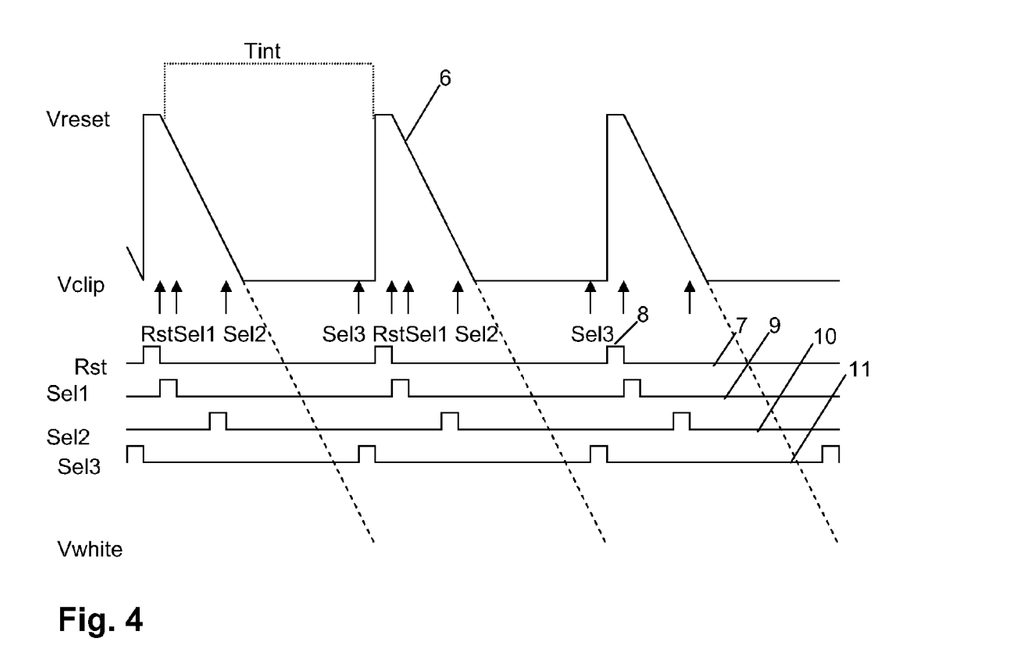
FIG. 4 shows further time dependent signal graphs with an additional shift register signal.

FIG. 4 shows further time dependent signal graphs with an additional selection line 11 realised as a shift register signal Sel3. The charging-line 6 shows the charge build-up in an image sensor according to the invention and the corresponding addressing pulses Rst, Sel1, Sel2 and Sel3 for resetting and reading out the video signals. In the figure a very bright illumination is assumed, which saturates the image sensor in the middle of the maximum integration time Tint. A corresponding white value is indicated by the dashed lines extrapolating the curves. However since the signal is clipped at a predetermined level Vclip the white value actually corresponding to the illumination and the integration time cannot be reached.

For example the integration time is set to Tint=20 ms, which corresponds to a frame rate of 50 Hz, and the time moment for addressing and/or reading out the photodiode PD1 with the selection pulse Sel2 is set to Tsel2=5 ms and the time moment for addressing and/or reading out the photodiode PD1 with the selection pulse Sel3 is set to Tsel3=20 ms. Since Vsel3 is clipped at Vclip, Vsel2 is used for extrapolating Vwhite as follows: Vwhite=Vsel2×Tint/Tsel2. Thus in the construction with three vertical shift registers for the different select tokens, both, improved black image response as well as extended dynamic range functionality can be implemented.

Figure 5:
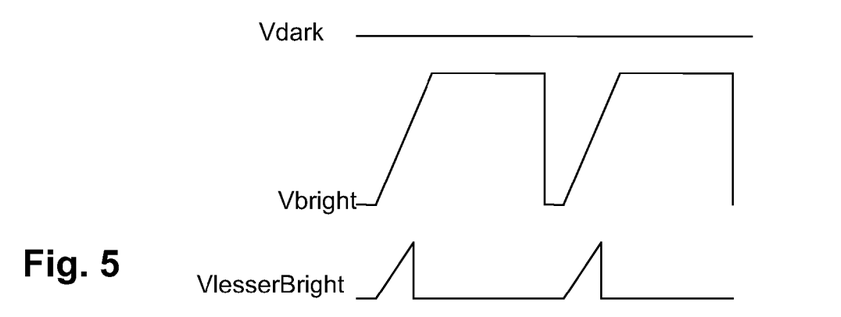
FIG. 5 shows exemplary signals generated during operation of the pixel cell in FIG. 2.

FIG. 5 shows signal curves generated by applying the selection pulses Sel1, Sel2 and Sel 3 and thus generating a dark signal Vdark, a bright signal Vbright and a lesser bright signal VlesserBright, respectively. It is to be noted that the sequence of the signals from top to bottom does not correspond with the sequence in which the signals were taken. In a first processing step Vdark is subtracted from Vbright and from Vlesserbright in order to correct or compensate fixed pattern noise (FPN) and kTC. A gain factor for Vlesserbright can be calculated as the quotient of the total integration time Tint and the time Tsel2 during which the imager has been exposed prior to reading the value for Vlesserbright. This gain factor is applied to the value read for VlesserBright in order to determine a value that would have been read if the image sensor would not have been saturated.

Figure 6:
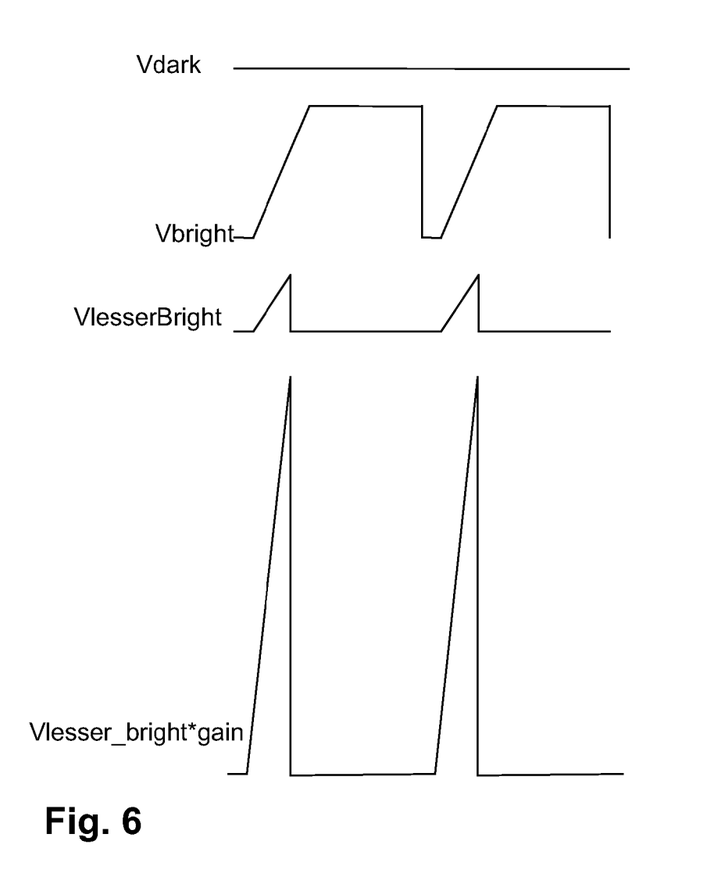
FIG. 6 shows the signals in FIG. 5 after a pre-processing step.

FIG. 6 shows the exemplary signals of FIG. 5 complemented by a signal corresponding to the value for VlesserBright corrected by the gain factor. The maximum level of the corrected VlesserBright of each frame corresponds to the extrapolated Vwhite for the respective frame.

In a preferred embodiment of the invention the signal acquired by reading the bright value and the signal acquired by reading and correcting the lesser-bright value VlesserBright are combined in dependence of the respective values.

Generally spoken, in darker areas of the image only the bright value signal is preferably used, since this signal holds the most accurate values for darker areas. In very bright areas of the image, on the other hand, only the corrected signal VlesserBright is preferably used, since the bright value may be clipped and the lesser-bright value holds information about the dynamics of the image.

In a transition zone a level-dependent gain is applied to both signals, and both signals are combined. The sum of the gain of both signals is preferably adjusted equivalent to 1.

Figure 7:
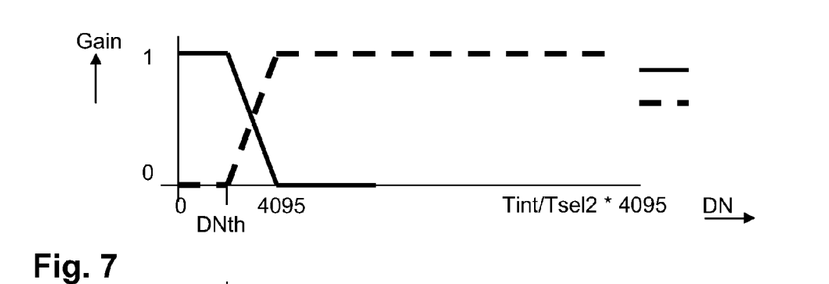
FIG. 7 shows a transfer function for the gain of the signals in FIG. 5 or 6.

FIG. 7 shows exemplary values for the gain of the bright value (continuous line) and the lesser-bright value (dotted line) as a transfer or gain function. On the horizontal axis the accumulated illumination of the pixel expressed in digital numbers and on the vertical axis the gain factor is displayed. In the figure DNth corresponds to a threshold. From this threshold on the lesser-bright signal is applied in an increasing fashion. In the figure, the value 4095 corresponds to a 12 bit resolution of an exemplary ADC used in this example.

EXAMPLE

Tint/Tsel2=10
Tint=16.6 ms (@ frame rate 60 Hz)
Tsel2=1/10×Tint=1.66 ms

The lesser-bright signal ranges from 0 to 10×4095=40950. The resulting output corresponds to log(40950)/log(2)=16 bit resolution.

The resolution in the dark areas is determined by the 12 bit Vbright signal, and the virtual resolution in bright areas is calculated from the gain-corrected VlesserBright signal.

Figure 8:
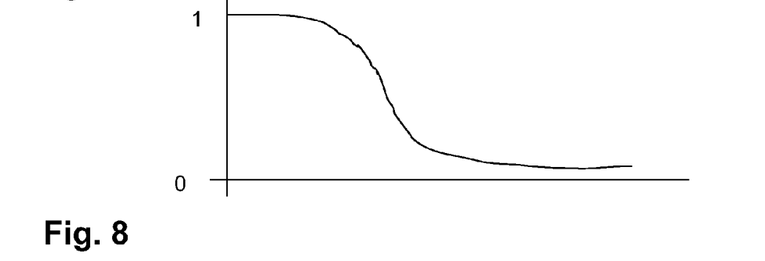
FIG. 8 shows an exemplary curve for high-light compressing.

In order to achieve a proper behaviour in the transition zone an arctan curve is proposed to bring the combined signal back to a 10 bit-resolution signal. This may be considered as highlight compression, Knee function, or logarithmic transfer curve. An exemplary curve is shown in FIG. 8. The arctan curve has a gain of 1 for small values, corresponding to values representing dark pixels, and for higher values, corresponding to pixels of higher brightness, the gain is decreasing, thereby attenuating an input value by the corresponding arctan value.

All timing moments are adjustable in the range within Tint, that is to say the time instance when the signals are samples can be adjusted within Tint. In this way different extended dynamic range settings can be provided, adjusted by the user or by an automatic dynamic range algorithm, depending on the scene to be photographed.

According to the invention, an automatic dynamic range algorithm includes measuring the average video level for signals acquired at Tsel2 across the whole image and measuring the average video level for signals acquired at Tsel3 across the whole image. Using these two parameters Tsel2 and/or Tsel3 can be adjusted so that the signal acquired at Tsel3 contains around 50 percent clipped values, and the signal acquired at Tsel2 contains around 10% clipped values. The settings of how many clipped to values are sampled at time instants Tsel2 and Tsel3 are given as exemplary values only. They can be set depending on the requirements of the user or other requirements.

Current state of the art dynamic range for CMOS imagers is around 400%.

With the extra measurement of Vsel2, the dynamic range is improved to:

Example 1

Tsel2=5 ms: Tint/Tsel2=20 ms/5 ms=4× higher=>1600%

Example 2

Tsel2=2 ms: 20 ms/2 ms=10×

Example 3

Tsel2=200 us: 20 ms/200 us=100×

Example 4

Tsel2=20 us: 20 ms/20 us=1000×

Example 5

Tsel2=2 us: 20 ms/2 us=10000×

Example 6

Tsel2=200 ms: 20 ms/200 ns=100000×

So with Tsel2=200 ns theoretically a 100.000×400%=40.000.000% dynamic range can be achieved.

The examples show the relation of the maximum integration time and the time when the value for the signal acquired at Tsel2 is sampled.

As long as the signal acquired at Tsel2 is not clipped, the signal acquired at Tsel1 can be considered as additional bits on the ADC.

To perform VDDS and provide the extended dynamic range, in one embodiment the imager is run at three times the desired frame rate. For video formats of 1080P30/1080I60 this means the output data rate is 74×3=222 Msamples/sec. With two ADCs in the imager one for odd, one for even pixels, each ADC would have to be operated at 111 MHz. It is of course possible to reduce this frequency by adding more ADCs, thereby linearly reducing the required operating frequency with the number of additional ADCs.

A method for improving the dynamic range and providing correlated double sampling hence includes subtracting the signal acquired at Tsel1 (reset value) from the signal acquired at Tsel2 and the signal acquired at Tsel3 for suppressing kTC noise and shading artefacts. Further, a gain factor for the signal acquired at Tsel2 corresponding to Tint/Tsel2 is calculated and applied to the signal acquired at Tsel2. Then, the signal acquired at Tsel2 and the signal acquired at Tsel3 are combined with a weighting factor depending on the signal acquired at Tsel2.

In a development, the signal acquired at Tsel2 and the signal acquired at Tsel3 are added. As long as the signal acquired at Tsel3 is not clipped, the addition reduces temporal noise by a factor of square root of 2.

Figure 9:
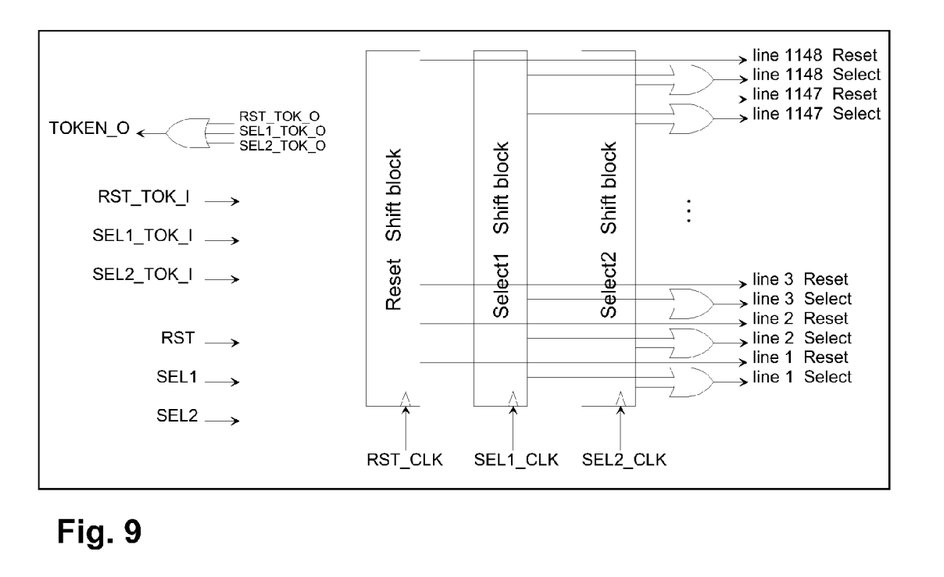
FIG. 9 illustrates a schematic block diagram of the shift registers used in accordance with a first embodiment of the invention.

FIG. 9 illustrates a schematic block diagram of three shift registers used in accordance with the invention. Preferably the shift registers are implemented as vertical shift registers. With this embodiment the method for generating Vlesser-Bright and Vbright values as described in connection with FIG. 3 can be realised or one of the shift registers is used twice during a frame period so that the method for generating Vdark, VlesserBright and Vbright values as described in connection with FIG. 4 can be realised.

Figure 10:
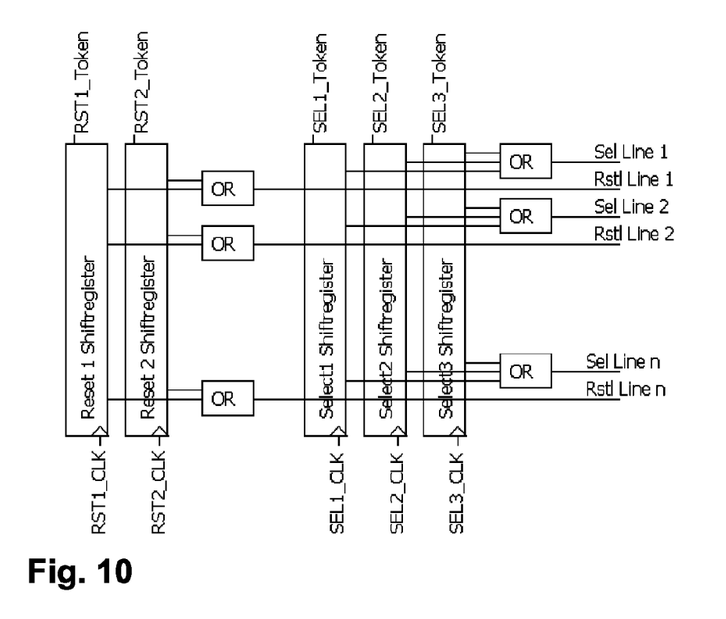
FIG. 10 depicts a schematic block diagram of the shift registers used in accordance with a second embodiment of the invention.

FIG. 10 shows a schematic block diagram of another development of the invention, whereby three shift registers are provided for selecting pixel circuits for reading out and two shift registers are provided for resetting the respective pixel circuits independently. Compared to the prior art two additional shift registers for selecting for readout and one optional additional shift register for resetting are provided.

Using the configuration according to this development of the invention the following different readout modes are possible:
1. Analogue Double Sampling mode
2. Digital Double Sampling mode
3. High dynamic range mode
4. Second reset to readout a black line In order to perform the first readout mode mentioned only one reset and one select register are required. However, this mode brings about some disadvantages. Firstly, the measured kTC noise actually belongs to the subsequent integration period, resulting in the suppression of fixed pattern noise, or FPN, only. Secondly, if the integration time is shortened the fixed pattern noise belonging to a wrong line is used for correcting, resulting in a bad correction of the fixed pattern noise, if at all.

In the second mode a bright value and a dark value can be read out from each pixel circuit when the readout frame rate is increased by a factor of 2. According to a method for performing digital double sampling the dark values are stored in a frame store and gain-corrected to compensate for the shorter integration time.

Figure 11:
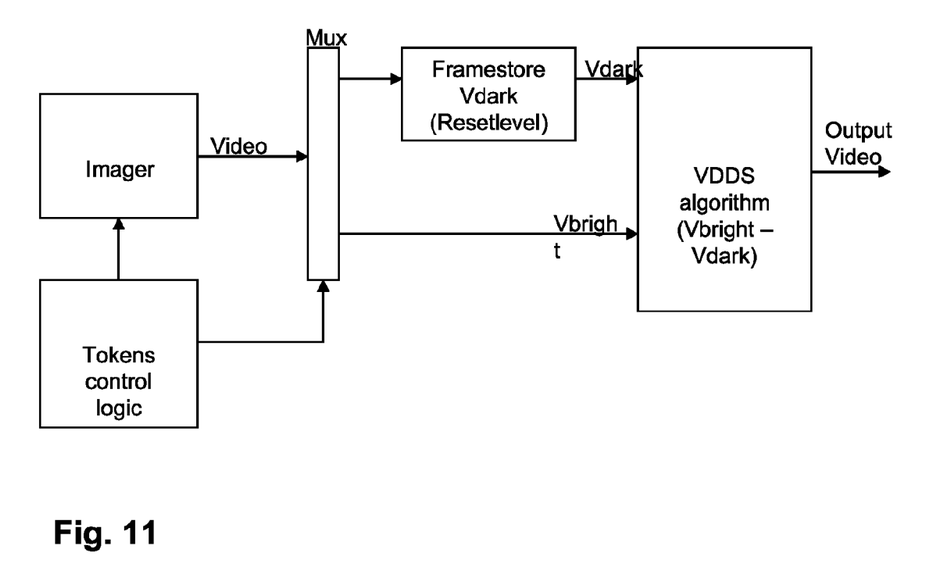
FIG. 11 shows a block diagram of an image sensor, which uses VDDS.

An exemplary block diagram of a circuit for performing the second mode is shown in FIG. 11. This mode and this circuit allow for compensating for the kTC noise by using correlating values. Further, horizontal and vertical shading artefacts are suppressed. Yet further the fixed pattern noise from each pixel is measured and corrected independently. This circuit further allows for flexibly setting integration times by changing the signing of the readout from the frame store.

The third mode has been described further above and is not referred to in detail again.

In a fourth mode a black line is read out in order to allow for suppression of column fixed pattern noise. Alternatively, only one line of the image can be read out for correcting for column fixed pattern noise.

Figure 12:
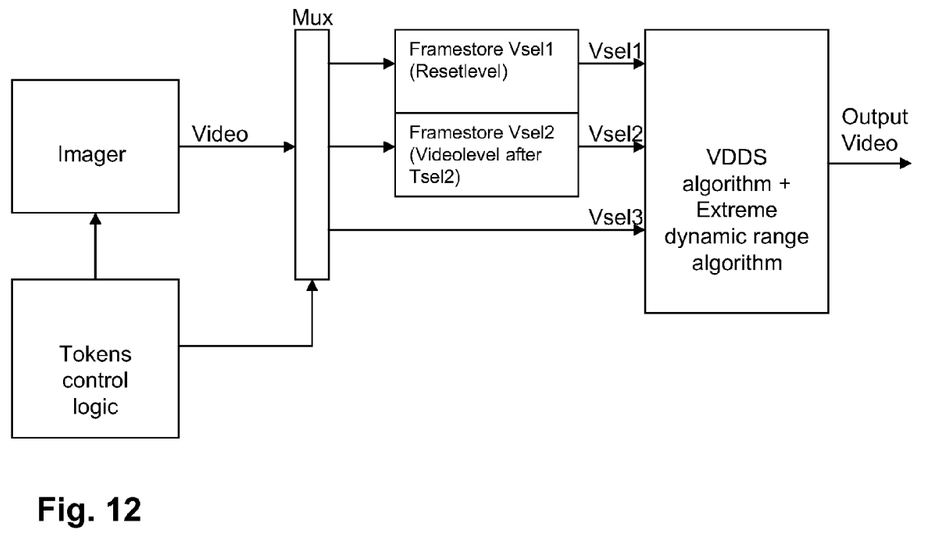
FIG. 12 illustrates a block diagram of an image sensor as a third embodiment of the invention.

FIG. 12 shows a basic block diagram of an image sensor according to the invention. The image sensor comprises an imager with a plurality of pixel cells, for example arranged in rows and columns. A Tokens control logic, which is for example embodied as a system of shift register as shown in FIG. 10, addresses the pixel cells for readout. The read-out values are transferred over a multiplexer Mux unit and divided into three channels, whereby a first channel guides the reset-level values Vsel1 in a first framestore and a second channel guides the video-level values after Tsel2, i.e. the lesser bright values, to a second framestore. After completing the frame period both framestores are emptied into an accumulating unit, in which also a third channel guiding the video-level values after Tsel3, i.e. the bright values, ends. In the figure, Vsel1 corresponds to the dark value, or Vdark, Vsel2 corresponds to a video level at Tsel2, or a lesser bright value, and Vsel3 corresponds to a video level at the longest, preferably the maximum integration time, or a bright value. In the accumulating unit the VDDS and additionally the extreme dynamic range algorithm as described previously are performed in order to generate an output video.

A corrected high dynamic video output or two data streams, one with the nominal image, and one for high dynamic range, can selectively be output.

Figure 13:
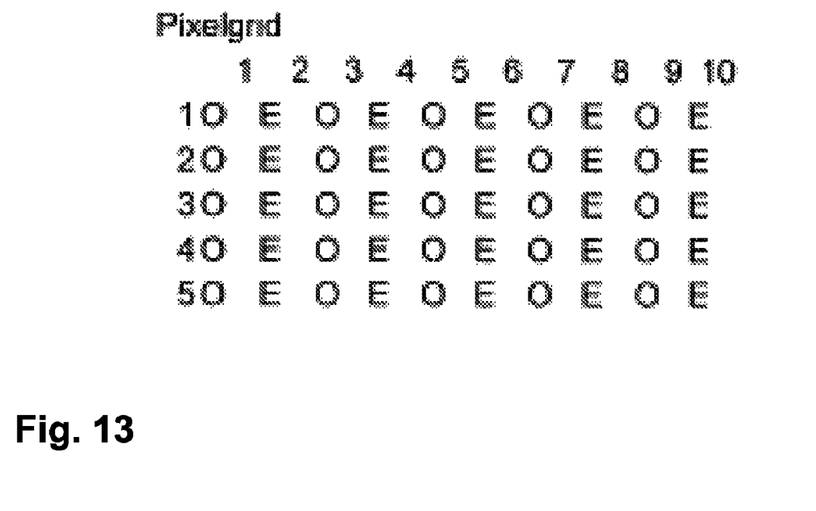
FIG. 13 shows a matrix with matrix elements, representing real pixel cells of an image sensor.

FIG. 13 shows an exemplary pixel grid with alternating odd and even pixels arranged in lines. Letters O and E indicate odd and even.

According to an embodiment of the invention, neighbouring lines or rows are read out after different integration times. For example odd and even numbered rows are read out for different integration times.

Using the circuit having three shift registers, a first select signal coming from the first shift register is used for reading a bright value in the odd rows and a lesser-bright value in the even rows. A second select signal coming from the second shift register is used for reading out the dark values of odd rows. A third select signal coming from the third shift register is used for reading out the dark values of even rows.

Figure 14:
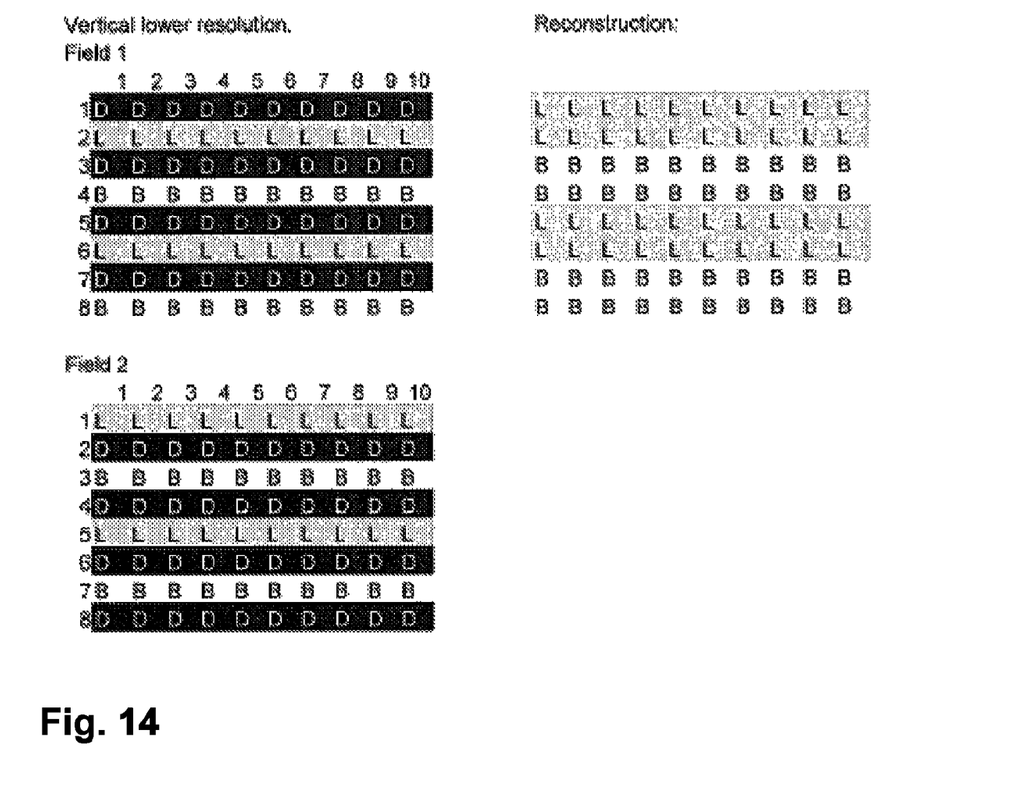
FIG. 14 a possible alternative read out method according to the invention.

FIG. 14 shows a reading pattern of rows of pixels, in which subsequent rows are read out after different integration times. Letters D indicate a dark value, letters L indicate a lesser-bright value read out after a shorter integration time and letters B indicate a bright value read out after the maximum integration time. The exemplary pixel grid is the same as presented in FIG. 13. The first row of the first field is read out to produce a dark value. The second row of the first field is read out to produce a lesser-bright value. The third row of the first field is read out producing a dark value again, and the fourth row of the first field is read out to produce a bright value. The sequence above is repeated until the first field is completely read out. The sequence is then shifted by one row for reading out the second field. In the second field, the first row is read out to produce a lesser-bright value. The next row, the second row, is read out to produce a dark value. The third row is read out to produce a bright value, and the fourth row is read out to produce a dark value again. This sequence is repeated until the second field is completely read out. FIG. 14 further shows on the right-hand side how the first and the second field are reconstructed into one frame. It can be seen that the first and the second row contain lesser-bright values and the third and the fourth row contain bright values. This sequence is continued until the end of the frame. This embodiment of the method provides an improved dynamic range at the expense of a possibly reduced vertical resolution.

Figure 15:
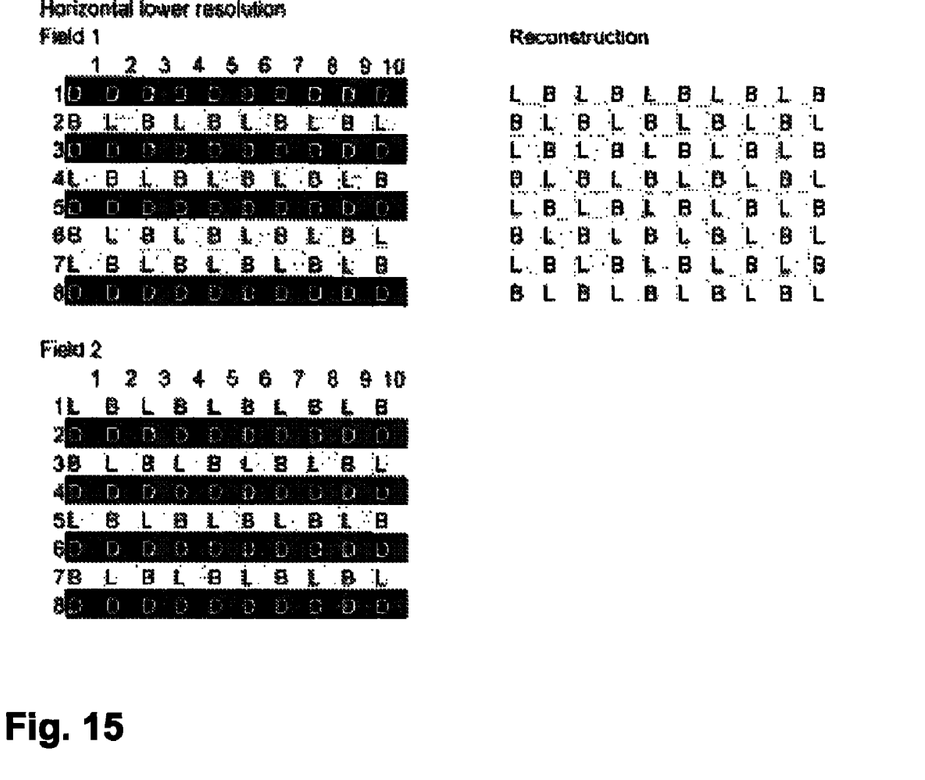
FIG. 15 a further alternative read out method according to the invention.

In another embodiment an improved dynamic range is achieved at the expense of a possibly reduced horizontal resolution. A corresponding pattern is shown in FIG. 15. In this case, reading out dark values in every second row is maintained like presented in the first embodiment. However, alternating timing for reading out bright values and lesser-bright values is applied for odd and even columns. Similar to the first embodiment the readout pattern is shifted between subsequent fields. However, the column readout pattern is shifted between subsequent fields as well. On the right-hand side of FIG. 15 a reconstructed frame is shown. At checkerboard-like pattern of pixels containing lesser-bright values and bright values can be seen.

For reading out the image sensor according to the second embodiment of the invention a selection input for the column capacitors which are storing the read values may be needed. To this end it is possible to provide a split for the column capacitor switches for the two outputs, i.e. odd and even columns.

In this embodiment, the full image is read out in two fields in an interlaced mode. It may be, however, also possible to adapt the alternating readout scheme for reading out full images, or progressive video. The term fields in this specification is used for half-images of interlaced video. The term frame is used for full images of progressive video.

All timing moments are adjustable in the range within the integration time Tint, that is to say the time instance when the signals for the lesser-bright values are sampled can be adjusted within Tint. In this way different extended dynamic range settings can be provided, adjusted by the user or by an automatic dynamic range algorithm, depending on the scene to be photographed.

According to one development of the invention, an automatic dynamic range algorithm includes measuring the average video level for Vsel2 across the whole image and measuring the average video level for Vsel3 across the whole image. Using these two parameters Vsel2 can be adjusted so that Vsel3 contains +−50 percent clipped values, and Vsel2 contains +−10% clipped values. The settings of how many clipped to values are sampled for Vsel2 and Vsel3 are giving as exemplary values only. They can be set depending on the requirements of the user or other requirements.

Figure 16:
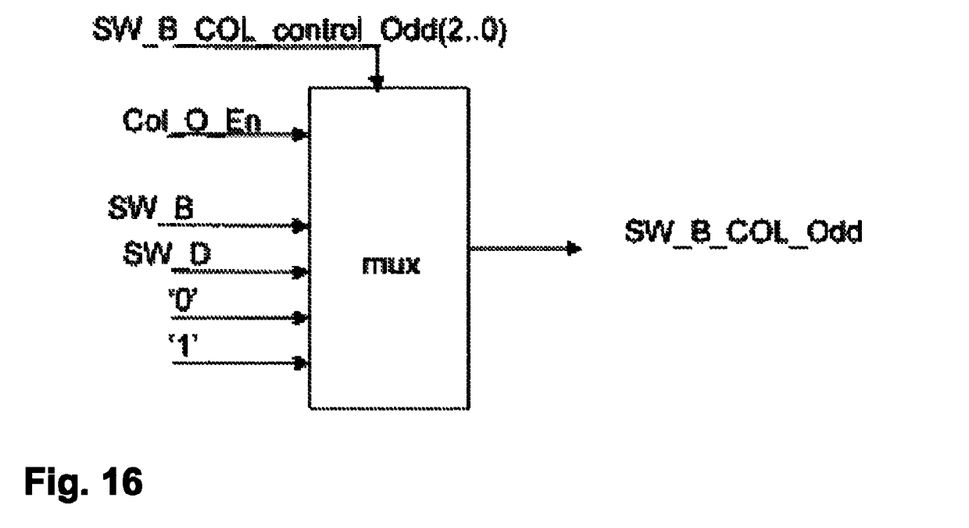
FIG. 16 a multiplexer adapted to the further alternative of the read out method.

FIG. 16 shows a possible multiplexer for driving column capacitor switches. In the figure, the label COL_O_En indicates an input to the multiplexer for selecting odd or even columns. The label SW_B_COL_control_Odd (2 . . . ) indicates an input to the multiplexer which provides a control via an SPI register. The following table shows a logic table for the multiplexer:

Logic Table for the Mux:
SW_B_COL_control_Odd(2 . . . 0)=>SW_B_COL_Odd (bits 2 . . . 0)
000==>SW_B
001==>SW_D
010==>Logic low
011==>Logic high
100==>SW_B AND COL_O_En
101==>SW_D AND COL_O_En
110==>Reserved
111==>Reserved The multiplexer is used for selecting between storage means for dark and bright values for each column, between odd and even pixels and between a read out a signal as a reference voltage. In total at combinations are conceivable:

SW_B_COL_Odd (shown in the example)
SW_B_COL_Even
SW_D_COL_Odd
SW_D_COL_Even
SW_B_REF_Odd
SW_B_REF_Even
SW_D_REF_Odd
SW_D_REF_Even Since it is possible to selectively read out odd and even pixels within a line or row by using multiplexers for the columns, the frame rate can also be increased.

Although the invention was inter alia described with reference to an image sensor having three shift registers for readout it is also possible to use the invention with imagers having less shift registers. In this case it may be advantageous to be able to clock the shift registers at variable clock rates.

The invention claimed is:

1. Method for controlling an image sensor having pixel cells arranged in rows and columns, the method comprising the steps of:
providing a main integration period;
providing at least a first time instant and a second time instant during the main integration period for reading out each pixel cell at least once, generating at least one pixel signal per pixel cell;
wherein the method is comprised by the steps of:
resetting and reading out a first group of pixel cells at least at the first time instant during the main integration period;
resetting and reading out a second group of pixel cells at least at the second time instant during the main integration period;
combining at least one pixel signal of a pixel cell of the first group of pixel cells and one pixel signal of a pixel cell of the second group of pixel cells in a weighted manner in dependence on a saturation level of the pixel cells for producing a combined output signal.

2. The method of claim 1, wherein the pixel cells of the first and the second group of pixel cells are arranged alternating in every other row or in a checkerboard pattern.

3. The method of claim 1, wherein for every other main integration period the time instants for reading out the pixels are exchanged between the first and the second group of pixels.

4. The method of claim 1, further comprising reading out the pixel cells at a further time instant during the main integration period for obtaining a dark signal, wherein the dark signal is preferably read out at the beginning of the main integration period, and wherein the dark signal is subtracted from the lesser-bright signal or from the bright signal.

5. The method of claim 1, wherein the combining step includes compensating the reduced exposure-time of the lesser-bright signal, wherein the lesser-bright signal is amplified by a factor depending on the ratio between the main integration period and the time period between a first reset and the readout of the lesser-bright signal.

6. The method of claim 1, wherein the combining step includes using a weighting function comprising an extended transition section, wherein the lesser-bright signal and the bright signal are amplified by a lesser-bright gain and a bright gain, respectively.

7. The method of claim 6, wherein the transition zone ends at or below a threshold value, which is equivalent to the maximum read-out value of the bright signal.

8. The method of claim 1, wherein pixel cell signals from two subsequent main integration periods are combined.

9. The method of claim 1, further comprising the step of adaptively setting, for a current or future main integration period, the first and second time instants for reading out the lesser-bright signal and/or the time for reading out the bright signal depending on a number of lesser-bright signals and/or bright signals across the whole image that exceeded a predetermined value during a preceding main integration period.

10. The method of claim 1, further comprising combining the signals of multiple real pixel cells into a corresponding signal of a virtual pixel cell.

11. Image sensor readout circuit adapted to perform the method of claim 1.

* * * * *